(12) United States Patent
Bates

(10) Patent No.: US 7,524,577 B2
(45) Date of Patent: *Apr. 28, 2009

(54) LONG LIFE THIN FILM BATTERY AND METHOD THEREFOR

(75) Inventor: John B Bates, Oak Ridge, TN (US)

(73) Assignee: Oak Ridge Micro-Energy, Inc., Oak Ridge, TN (US)

( * ) Notice: Subject to any disclaimer, the term of this patent is extended or adjusted under 35 U.S.C. 154(b) by 631 days.

This patent is subject to a terminal disclaimer.

(21) Appl. No.: 11/162,311

(22) Filed: Sep. 6, 2005

(65) Prior Publication Data

US 2008/0003492 A1   Jan. 3, 2008

(51) Int. Cl.
*H01M 2/02* (2006.01)
*H01M 2/08* (2006.01)

(52) U.S. Cl. .......................... 429/66; 429/162; 429/185

(58) Field of Classification Search .................. 429/66, 429/162, 185, 322; 29/623.2
See application file for complete search history.

(56) References Cited

U.S. PATENT DOCUMENTS

| | | | | |
|---|---|---|---|---|
| 5,561,004 A | | 10/1996 | Bates et al. ................. 429/162 |
| 5,629,107 A | * | 5/1997 | Shioda et al. ............. 429/66 X |
| 6,368,746 B1 | * | 4/2002 | Takada et al. ............... 429/305 |
| 6,387,563 B1 | | 5/2002 | Bates ......................... 429/124 |
| 6,764,525 B1 | | 7/2004 | Whitacre et al. ........... 29/623.2 |
| 2002/0071989 A1 | | 6/2002 | Verma et al. ................ 429/176 |
| 2004/0029311 A1 | | 2/2004 | Snyder et al. ............... 438/106 |
| 2005/0095506 A1 | | 5/2005 | Klaassen .................... 429/322 |
| 2007/0037058 A1 | * | 2/2007 | Visco et al. ............. 429/185 X |
| 2008/0032200 A1 | * | 2/2008 | Bates ......................... 429/322 |

FOREIGN PATENT DOCUMENTS

JP       63298980       12/1988

* cited by examiner

*Primary Examiner*—Stephen J. Kalafut
(74) *Attorney, Agent, or Firm*—Luedeka, Neely & Graham, PC

(57) ABSTRACT

A method for improving the useful life of a thin film lithium-ion battery containing a solid electrolyte and an anode that expands on charging and long life batteries made by the method. The method includes providing a hermetic barrier package for the thin film battery that includes an anode expansion absorbing structure.

19 Claims, 3 Drawing Sheets

LONG LIFE THIN FILM BATTERY AND METHOD THEREFOR

FIELD

The disclosure relates to thin film batteries and in particular to improved, long-life thin film batteries and methods for making long-life thin film batteries.

BACKGROUND AND SUMMARY

Thin-film rechargeable batteries have numerous applications in the field of microelectronics. For example, thin-film batteries may provide active or standby power for microelectronic devices and circuits. Active power source applications of the thin-film battery include, for example, implantable medical devices, remote sensors, wireless sensors, semiconductor diagnostic wafers, automobile tire sensors, miniature transmitters, active radio frequency identification (RFID) tags, smart cards, and MEMS devices. Standby power source applications of thin-film batteries include non-volatile CMOS-SRAM memory products such as memory ships for computers, sensors, and passive RFID tags.

In a thin-film battery, a chemical reaction takes place between an anode and cathode by interaction of the anode and cathode through an electrolyte. The attractiveness of thin-film batteries over conventional batteries is that the electrolyte is a solid or non-flowable material rather than a liquid. Liquid electrolytes pose leakage problems and are often highly corrosive. Of the solid electrolytes, thin-film batteries typically employ glassy ceramic electrolytes. Solid electrolytes are desirable in cells or batteries where liquid electrolytes may be undesirable, such as in implantable medical devices. Preferred solid electrolytes include materials that are amorphous solids with high melting temperatures (greater than about 900° C.), electrically insulative and ionically conductive.

One of the challenges for thin film battery manufacturers is to provide a thin film battery that will have an extended life when exposed to an oxygen-containing atmosphere. An extended life is particularly difficult to obtain with thin film batteries containing anode materials which are highly reactive with oxygen and/or water or water vapor. Various barrier materials have been applied to thin film batteries to reduce the reactivity of the anode materials toward oxygen and/or water or water vapor. However, such barrier materials have met with limited success.

For example thin film batteries must be sealed or packaged in barrier materials in order to be able to operate in an air environment for a practical length of time. A suitable package must limit the permeation of oxygen and water vapor to such a small level as to allow at least 80% of the battery's capacity to be available after months to years of storage and/or operation. Thin film batteries can be stored in dry environments in which the relative humidity is sufficiently low that water vapor permeation is not a life-limiting factor. However, exposure to air reduces battery life to a few days if oxygen permeation is not restricted to a sufficiently low level by a suitable barrier package. In applications such as automobile tire sensors wherein wireless sensors are imbedded in the sidewalls of the tire, thin film batteries also must be protected from hydrostatic pressure.

A thin film encapsulation process is the preferred method of sealing, because the encapsulation layers may be deposited using the same equipment employed in making the batteries. However, silicon, tin, and silicon-tin alloy anodes of thin film lithium-ion batteries may expand uniaxially along the orthogonal direction to the film by over 250% during a charge step. Such expansion strains the protective encapsulation material to the point of fracture allowing oxygen and water vapor to rapidly reach the anode. While a polymer film may be able to accommodate the strain imposed by an expanding anode, a polymer film alone does not provide a sufficient barrier to oxygen and water vapor.

As advances are made in microelectronic devices, new uses for thin-film batteries continue to emerge. Along with the new uses, there is a need for high performance thin-film batteries having improved life. In particular, there is a need for rechargeable thin film batteries that have a life approaching at least five years or longer. Accordingly, there continues to be a need for improved hermetic seals for thin film batteries that enable use of such long life batteries in new applications. There is also a need for batteries that are able to withstand hydrostatic pressures above atmospheric pressure.

With regard to the above, there is provided in one embodiment a method for improving the useful life of a thin film lithium-ion battery containing a solid electrolyte and an anode that expands on charging and long life batteries made by the method. The method includes providing a hermetic barrier package for the thin film battery that includes an anode expansion absorbing structure.

Another embodiment of the disclosure provides a thin film lithium-ion battery having, a cathode, a solid lithium-ion conducting electrolyte, an anode selected from the group consisting of silicon, tin, and silicon-tin alloys. The battery includes a hermetic seal, wherein the hermetic seal has an anode expansion absorbing structure.

Yet another embodiment of the disclosure provides a method of making multiple long-life thin film battery cells on a single substrate. The method includes the step of depositing battery layers including cathodes, electrolytes, and anodes through appropriate masks onto the substrate. A hermetic seal is constructed for each of the cells. The hermetic seal has an anode expansion absorbing structure. The open circuit voltage and resistance of each of the cells is determined using a wafer prober in conjunction with a programmable electrometer to identify rejected cells. Rejected cells are ink marked, and the substrate is diced to provide a plurality of thin film batteries.

An advantage of the disclosed embodiments is that improved hermetic seals for thin film batteries having anodes that greatly expand on charging may be provided. While conventional thin film batteries containing lithium anodes and anodes that do not greatly expand on charging may use conventional hermetic seals, thin film batteries that have anodes that expand over about 200 percent of their height may benefit from the improved hermetic seals and sealing methods provided herein.

BRIEF DESCRIPTION OF THE DRAWINGS

Further advantages of the disclosed embodiments will become apparent by reference to the detailed description when considered in conjunction with the figures, wherein like reference numbers indicate like elements throughout, and wherein.

DETAILED DESCRIPTION OF EXEMPLARY EMBODIMENTS

It has been found that thin anode films of sputtered deposited amorphous silicon undergo a volume expansion of about 300 volume % as lithium is inserted into the films from a composition with 0 atomic % Li to the final composition of the saturated alloy, $Li_{4.4}Si$ (i.e. $Li_{22}Si_5$) during a thin film battery charging operation. For a thin film lithium-ion battery with a silicon anode, the charge step may be represented by the formula:

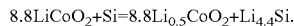

Because the thin film batteries are bonded to a solid substrate, most of the anode expansion manifests itself as an increase in the height of the anode by over 250%. Similar results are obtained with tin anodes as the lithium content ranges from 0 to $Li_{4.4}Sn$.

If the $LiCoO_2$ cathode is 30,000 Angstoms thick, for example, the minimum thickness of a silicon anode prior to charging that is required to achieve a fully saturated single phase alloy ($Li_{22}Si_5$) at the end of the charge step is about 2120 Angstroms. During the charging step, the thickness of the silicon anode increases from 2120 Angstroms to about 5300 Angstroms.

The percentage expansion of the silicon anode may be reduced by increasing the thickness of the anode so that the alloy formed at the end of the charge step contains less atomic percent lithium, however, the operating voltage and therefore energy of such a battery may be correspondingly reduced. For example, if the final composition of the anode were $Li_{1.7}Si$, then the silicon anode thickness required prior to charging is 5485 Angstroms to achieve full capacity of the cathode. After charging, the anode thickness increases by a factor of about 1.2 to 6582 Angstroms. While the capacity remains the same, the energy is lowered by about 50% due to a lower average cell voltage. Although the strain from anode expansion is reduced with a thicker silicon anode, nevertheless, the stress induced by the anode expansion still exceeds the yield stress of conventional materials used for encapsulating thin film batteries.

In view of the problems of anode expansion during charging for lithium-ion thin film batteries using silicon and tin anodes, improved hermetic barrier packages and methods for hermetically sealing thin film batteries are described herein. An important component of the hermetic barrier package is that the package contains an anode expansion absorbing structure. Exemplary embodiments of such anode expansion absorbing structures are illustrated by reference to FIGS. 1-5.

Figure 1:
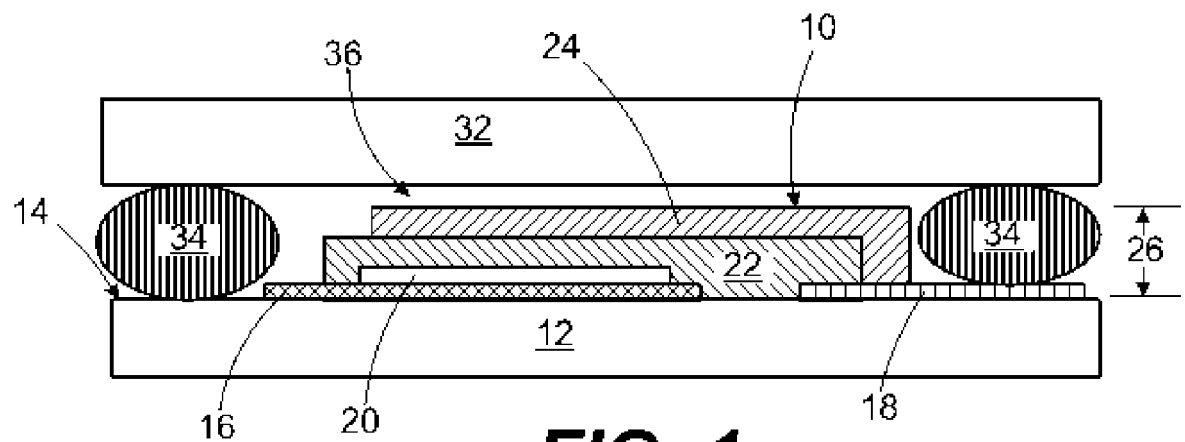
FIG. 1 is a cross-sectional view, not to scale, of a thin film battery that has been hermetically sealed according to a first embodiment of the disclosure.

In a first embodiment, a thin film lithium ion battery 10 is provided on a solid substrate 12 having a support surface 14 as illustrated in FIG. 1. A cathode current collector 16 is deposited on the support surface 14 of the substrate 12. An anode current collector 18 is provided on the support surface 14 of the substrate in a spaced-apart location relative to the cathode current collector 16. A cathode 20 is deposited on a portion of the cathode current collector 16. A solid electrolyte 22 is deposited over the cathode 20, on a portion of the support surface 14 of the substrate 12, and on a portion of the anode current collector 18. Next, an anode 24 is deposited on the electrolyte 22 and a portion of the anode current collector 18. The components of the thin film battery are referred to herein as the thin film battery stack 26. The thin film battery stack 26 has a maximum thickness of less than about 7 microns measured from the support surface 14 to the highest point of the battery stack 26 above the support surface 14.

The techniques for making thin film lithium, lithium-ion, and lithium-free lithium batteries, such as the battery 10 are described, for example, in the U.S. Pat. No. 5,567,210 to Bates et al., U.S. Pat. No. 5,612,152 to Bates, U.S. Pat. No. 6,168,884 to Neudecker et al., U.S. Pat. No. 6,242,132 to Neudecker et al. U.S. Pat. No. 6,423,106 to Bates, U.S. Pat. No. 6,818,356 to Bates, and the scientific literature. The construction as illustrated in FIG. 1 is such that the uppermost active layer is the anode 24. It is understood that the construction from the battery 10 from the anode 24 to the substrate 12 is the same as illustrated in FIG. 1 and described in the patent and scientific literature. The foregoing patents are incorporated by reference as if fully set forth herein.

Figure 2:
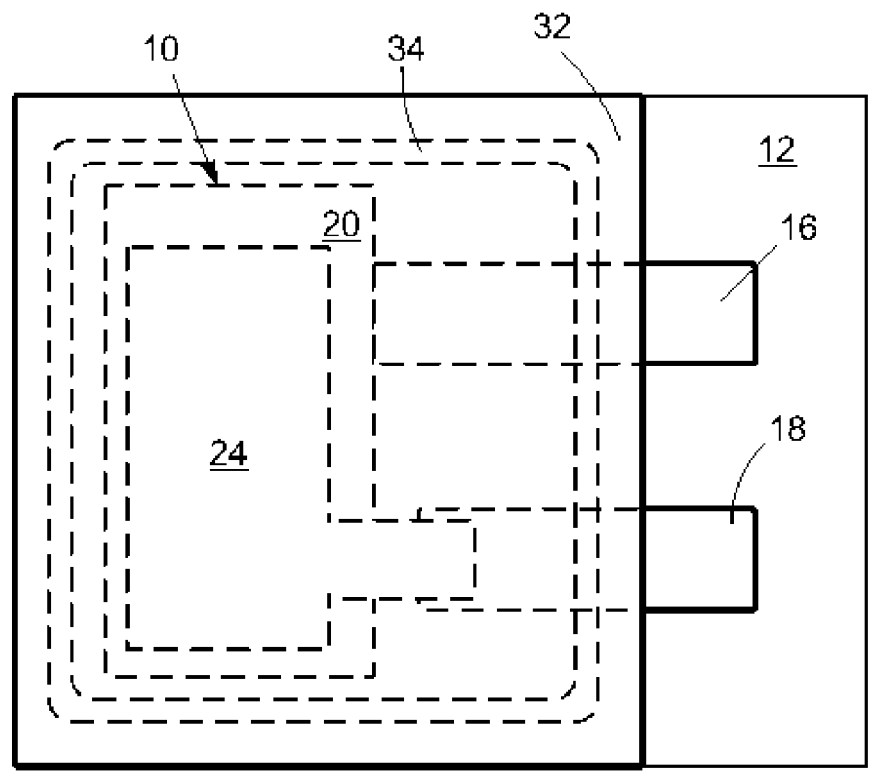
FIG. 2 is plan view, not to scale, of a thin film battery that has been hermetically sealed according to the first embodiment of the disclosure.

In the first embodiment illustrated in FIGS. 1 and 2, a hermetic package includes cover or lid 32 that is sealed to the current collectors 16 and 18 and the support surface 14 of the substrate 12 using an epoxy adhesive 34 or other adhesive material having suitable barrier properties. The cover 32 and epoxy adhesive 34 are disposed over the thin film battery 10 in a manner that allows for expansion of the anode 24. Accordingly, there may be a gap 36 between the cover 32 and the anode 24 ranging from about 20 to about 70 microns (μm) depending on the thickness of the epoxy adhesive 34. As shown in FIG. 2, the epoxy adhesive 34 circumscribes the thin film battery 10 components and provides a substantially water vapor and air impermeable seal with the cover 32.

In this embodiment, the cover 32 is relatively thick and is made of a dense material, e.g. glass, ceramic, or metal. Suitable ceramic materials include but are not limited to metal oxides, metal nitrides, metal carbides, borosilicate glasses, and the like, such as $Al_2O_3$, AlN, $SiO_2$, $Si_3N_4$, SiC, and $ZrO_2$. Suitable metal materials include, but are not limited to stainless steel, Al, Ti, and W. The cover 32 is has typically planar surface, however, in order to improve the mechanical strength of the cover 32, a corrugated cover 32 may be used. For all practical purposes, the cover 32 is substantially impermeable to oxygen and water vapor. The barrier properties of the hermetic package 30 are, therefore, determined by the epoxy adhesive 34 seal.

As shown in FIG. 2, a thin bead of epoxy adhesive 34, such as an alumina-filled epoxy adhesive available from Epoxy Technology, Inc. of Billerica, Mass. under the trade names EPO-TEK H77 or H77T, is dispensed around the periphery of the battery 10 inside the edges of the substrate 12 while leaving a sufficient area of the current collectors 16 and 18 exposed for making electrical connection to the battery 10. A bead of the epoxy adhesive 34 may be applied to the support surface 14 of the substrate 12 using an automated dispenser available from Asymtek of Carlsbad, Calif. under the trade name DISPENSEMATE 550 or similar dispensing system.

Once the bead of epoxy adhesive 34 has been dispensed around the periphery of the battery 10, the cover 32 having a thickness ranging from about 0.1 to about 0.3 mm is placed on the bead of adhesive 34. The weight of the cover 32 may compress the bead of epoxy adhesive 34 to form a seal that is approximately 20 to about 70 μm thick and about 1 to about 3 mm wide, depending on the viscosity and shape of the bead of epoxy adhesive 34. Otherwise, the bead of epoxy adhesive 34 may be compressed to any desired thickness by a pick and place tool that is used to place the cover 32 on the bead of adhesive 34. Placement of the cover 32 on the bead of adhesive 34 may be performed in a vacuum or inert gas environment to reduce the amount of air or moisture that is entrapped in the gap 36 between the cover 32 and the battery 10. The assembly of battery 10, substrate 12, cover 32 and adhesive 34 is then heated to a temperature up to about 200° C. to cure the epoxy adhesive 34.

Alternatively, the epoxy adhesive 34 may be an ultraviolet (UV) curable adhesive such as a UV curable adhesive available from Epoxy Technology, Inc. under the trade names EPOTEK OG152, EPOTEK OG142-17, and EPOTEK OG142-13. After placement of a transparent or translucent cover 32 on the bead of adhesive 34, the adhesive 34 may be cured by exposing the adhesive 34 to UV light using, for example, a UV curing system available from Henkel Loctite Corporation of Dusseldorf, Germany under the trade name ZETA 7410 UV curing system.

The barrier properties of epoxy adhesives 34, such as EPOTEK H77 and H77T epoxy adhesives to oxygen and water vapor permeation are not available; however, the helium leak rate of EPO-TEK H77 epoxy adhesive is reported to be about $1\times10^{-8}$ cm$^3$/s at 32° C. and 90% RH over 100 hours at atmospheric pressure. The foregoing leak rate is the volume of helium in cm$^3$ that passes through a membrane that is 1 cm$^2$ in cross section and 1 cm thick at the specified temperature and relative humidity. Multiplying by the ratio of thickness to area of the membrane gives a permeability of helium at one atmosphere of pressure of $1\times10^{-8}$ cm$^3$-cm/cm$^2$-sec. Data for other polymers reported in the literature indicate that the measured permeability for helium averages about four times higher than that for oxygen at 23° C. Therefore, the permeability of oxygen through the EPO-TEK H77 epoxy adhesive at 32° C. is about $3\times10^{-9}$ cm$^3$-cm/cm$^2$-s at one atmosphere of oxygen and about $10^{-9}$ cm$^3$-cm/cm$^2$-s at one atmosphere of air.

One gauge of thin film battery lifetime is determined by the time the capacity of the battery decreases to 80% of its rated value caused by reaction of the battery components with air or water vapor or by changes in the battery materials curing cycle. In order to understand the requirements of a hermetic barrier to prevent reaction of the battery components, especially the anode, with oxygen or water on exposure to air, the following example is given. In the example, a thin film battery with a 1 cm$^2\times3$ μm thick lithium metal anode is used. Lithium metal is chosen for the example because lithium is the most reactive anode material and therefore provides the most stringent test of a barrier material. While the area of the battery and therefore the anode could have any value, a 3 μm thick lithium anode is typical of thin film lithium batteries. For a theoretically dense lithium film, with a density of $\rho=0.534$ g/cm$^3$, the mass of lithium in the anode is 160 μg, and the number of moles of lithium, MW=6.941 g/mol, is 23.1 μmol. So, in order to lose no more than 20% of the capacity of the thin film battery due to reaction of the 1 cm$^2\times3$ μm lithium metal anode with air, the amount of lithium reacted must be less than or equal to 32 μg or about 4.6 μmol.

As set forth above the bead of epoxy adhesive 34 dispensed around the periphery of the battery 10 is typically about 0.02 to about 0.07 mm thick and about 2 to about 3 mm wide. For a periphery having a perimeter of 4 cm enclosing a 1 cm$^2$ area containing the battery 10, a flattened bead of adhesive 34 may have a thickness of about 0.04 mm and is about 3 mm wide. Hence the total cross sectional area of the flattened bead of adhesive 34 is 0.16 cm$^2$. The transmission rate of $O_2$ through the flattened area of the epoxy adhesive 34 bead is about $5\times10^{-10}$ cm$^3$/s or approximately $4\times10^{-15}$ mol/s ($1\times10^{-9}$ cm$^3$-cm/cm$^2$-s$\times$0.16 cm$^2$/0.3 cm) at one atmosphere of air at 25° C. With this transmission rate, the time to consume 20 percent of a 1 cm$^2\times3$ μm thick lithium metal anode (about $10^{-6}$ mol) by reaction with $O_2$ according to the following equation: $4Li+O_2=2Li_2O$ is about 9 years. If the width of the bead of adhesive 34 is reduced to 2 mm, the time to consume 20 percent of the lithium metal film is reduced to 6 years. Other ceramic-filled, one and two component epoxy adhesive available from Epoxy Technology, Inc. and Aremco Products, Inc. of Valley Cottage, N.J. may be used in place of the alumina-filled epoxy adhesives described above provided the permeability of the adhesive is within an acceptable range for providing a desirable battery life.

Figure 3:
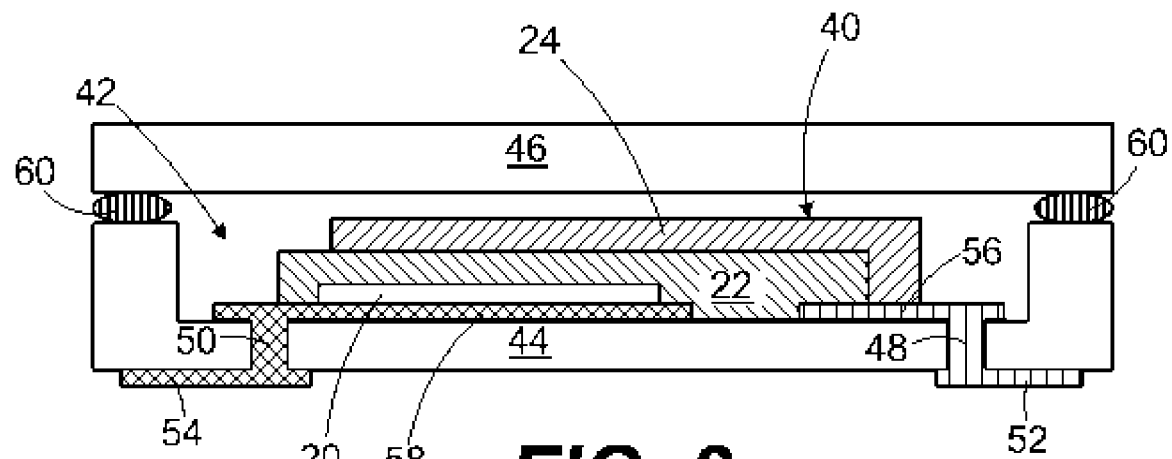
FIG. 3 is a cross-sectional view, not to scale, of a thin-film battery that has been hermetically sealed according to a second embodiment of the disclosure.

In a second embodiment, illustrated in FIG. 3, the battery 40 is deposited in a recessed area or pocket 42 of a substrate 44 and a cover 46 is hermetically sealed to the substrate 44 around a periphery of the pocket 42. In this embodiment, vias 48 and 50 may be etched through the substrate 44 to provide plated through-hole contacts 52 and 54 for the anode and cathode current collectors 56 and 58. The cover 46 may be sealed to the substrate 44 using brazing, laser welding, or an epoxy adhesive 60 as described above. In the alternative, a pocketed cover may be attached to a planar substrate by the foregoing methods. Chemical or dry etching techniques may be used to form the pocket 42 or cavity in the substrate 44 or pocketed cover.

Figure 4:
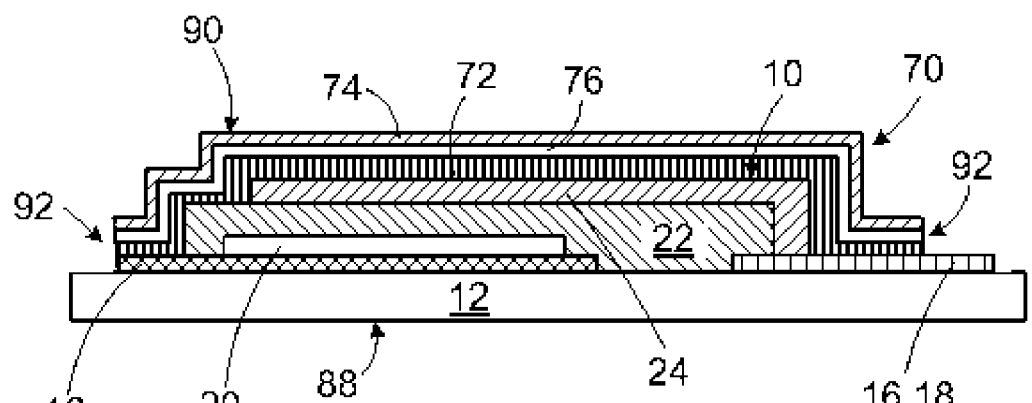
FIGS. 4 and 5 are cross-sectional views, not to scale, of a thin-film battery that has been hermetically sealed according to a third embodiment of the disclosure before and after charging.
Figure 5:
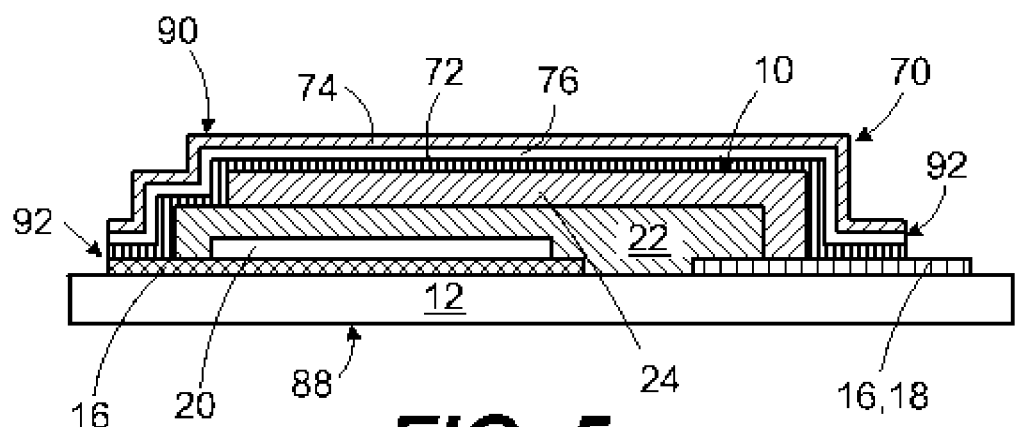

In some applications, such as providing power for semiconductor diagnostic wafers, the thin film battery must be a thin as possible. Accordingly, an alternative type of hermetic package is illustrated in FIGS. 4 and 5. In this embodiment, a multilayer hermetic sealing material 70 is used. The material 70 includes a polymeric sealing layer 72, at least one polymeric outer layer 74, and an inner metal foil layer 76 disposed between the polymeric layers 72 and 74.

Suitable multilayer hermetic sealing materials 70 include, but are not limited to, materials available from University Products, Inc. of Holyoke, Mass. under the trade name MARVELSEAL 360 and from Shield Pack LLC, of West Monroe, La. under the trade name SHIELD PACK CLASS PPD. The foregoing MARVELSEAL and SHIELD PACK materials contain two outer polymer layers 74, a metal foil layer 76, and a polymeric sealing layer 72. For example, the SHIELD PACK CLASS PPD material consists of a 0.48 mil thick Mylar outer layer, a 1 mil thick polyethylene layer, a 0.35 mil thick metal foil layer, and a 2.1 mil thick SURLYN sealing layer. SURLYN resin used for the sealing layer is a modified ethylene/methacrylic acid copolymer available from DuPont Packaging and Industrial Polymers of Wilmington, Del. By contrast, the MARVELSEAL 360 material has a nylon outer layer and an inner sealing layer of polyethylene. The transmission rates of water vapor and oxygen through the SHIELD PACK CLASS PPD and MARVELSEAL 360 barrier materials, as cited in the respective product literature, are given in Table 1.

TABLE 1

Water Vapor and Oxygen Transmission Rates Through Barrier Materials

| Barrier Material | Water Vapor Trans. Rate At 38° C., 90% RH (mol/cm$^2$-sec) | Oxygen Trans. Rate At 25° C., 1 atmosphere (mol/cm$^2$-sec) |
| --- | --- | --- |
| SHIELD PACK CLASS PPD | $1\times10^{-12}$ | $1\times10^{-15}$ |
| MARVELSEAL 360 | $5\times10^{-13}$ | $1\times10^{-16}$ |

The procedure for providing a hermetic seal for thin film batteries using the barrier material 70, described above, is to cover the battery 10 and substrate 12 with a piece of the barrier material 70 with the polymeric bonding layer 72 disposed adjacent the anode 24 of the battery 10. A portion of current collectors 16 and 18, as illustrated in FIGS. 1 and 2, is left exposed for making electrical contact to the battery. In the alternative, vias, such as vias 48 and 50 may be provided in the substrate 12, as described with reference to FIG. 3, to enable external contacts to be provided.

The barrier material 70 may be laminated to the battery 10 and substrate 12 under vacuum conditions in a vacuum laminator by heating a bottom surface 88 of the substrate 12 to a temperature ranging from about 115° to 140° C. for a few seconds while applying 3 to 50 psi pressure to an upper surface 90 of the barrier material 70 using a pressurized silicone rubber membrane. The temperature is then lowered to about 60° C., and the sealed batteries 10 are removed from the laminator.

While not desiring to be bound by theory, it is believed that the barrier material 70 is sealed to the battery 10 and substrate 12 though a process of melting and freezing of the bonding layer 72 during the heating and cooling steps of the process. Barrier properties of the barrier material 70 may be attributed to the metal foil layer 76, because the transmission rates of water vapor and oxygen through the polymeric layers 72 and 74 are relatively high.

Permeation of oxygen and water vapor into the sealed battery 10 mainly occurs through edges 92 where the bonding layer 72 is bonded to the substrate 12 and/or current collectors 16 and 18. From product literature, the permeability of oxygen through polyethylene and SURLYN resin is about $2\times10^{-13}$ mol-cm/cm$^2$-sec at one atmosphere of air at 25° C. The thickness of the bonding layer 72 is typically about 50 μm. Accordingly, the cross sectional area of a 4 cm perimeter is about 0.02 cm$^2$ (4 cm×50×10$^{-4}$ cm). Assuming a 2 mm wide seal provided by the bonding layer 72, the transmission rate of oxygen through the bonding layer 72 is $2\times10^{-13}$ mol/sec ($2\times10^{-13}$ mol-cm/cm$^2$-sec)×(0.02 cm$^2$/0.2 cm). With this transmission rate, the time to consume 20% of a 1 cm$^2$×3 μm thick lithium metal film by reaction with $O_2$ according to equation (2) above is about 9 months. Increasing the width of the bonding layer 72 seal from 2 to 3 mm increases the lifetime to about 14 months.

Because the bonding layer 72 is relatively compliant, it may be compressed upon expansion of the anode 24 without causing damage to the other layers 74 and 76 of the barrier material 70. The compressibility of the layer 72 is illustrated in FIGS. 4 and 5. In FIG. 4, the battery has not been charged, accordingly, and the anode 24 is in an unexpanded state. In FIG. 5, the battery has been charge, and the anode 24 is shown in an expanded state. As shown in FIG. 5, layer 72 is compressed when the anode expands 24 on charging.

Figure 6:
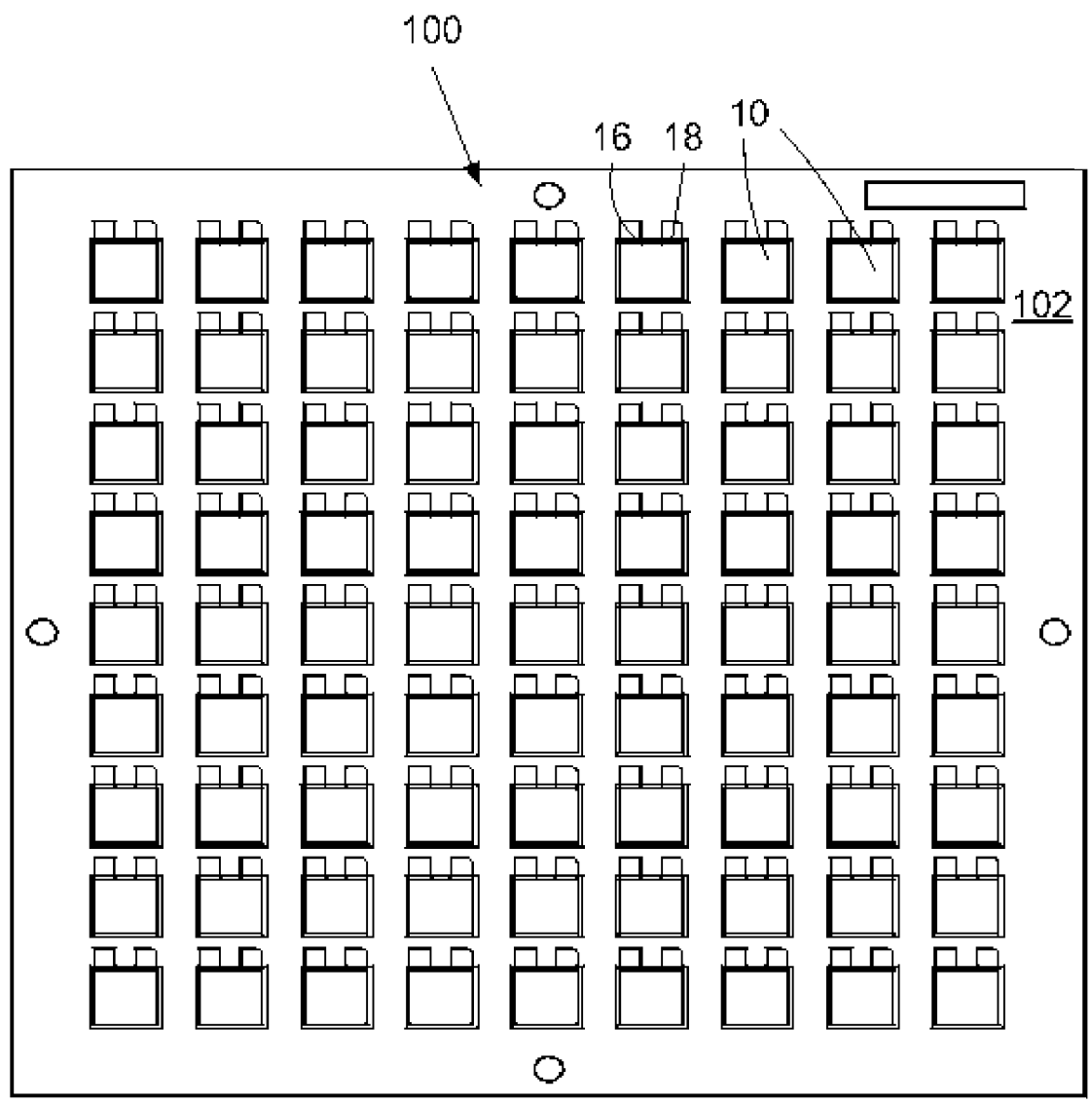
FIG. 6 is a plan view, not to scale, of an array of thin film batteries on a substrate that has been hermetically sealed according to the first embodiment of the disclosure.

A manufacturing technique for hermetically sealing thin-film batteries is illustrated in FIG. 6. According to the method, an array 100 of thin film batteries 10 is fabricated on a single substrate 102. After depositing the various layers forming the current collectors 16 and 18, cathodes 20, electrolytes 22, and anodes 24, beads of epoxy adhesive 34 (FIG. 2) are dispensed around a periphery of each of the batteries 10. Covers 32 are placed top of each battery 10 using a pick and place machine, and the substrate 102 is then heated to a temperature ranging from about 150° to about 200° C. to cure the epoxy adhesive 34. Alternatively, if a UV-curable epoxy adhesive 34 is used, the substrate and transparent or translucent covers 32 are exposed to UV light for a few seconds to cure the adhesive 34.

After curing the adhesive 34, the substrate 102 containing the array 100 of batteries 10 is placed on a vacuum chuck of a wafer prober, and each battery 10 is tested using two-point open circuit voltage and resistance measurements. The covers 32 of batteries 10 that fail the test are marked as defective with ink. The entire array 100 of batteries 10 is then diced using a dicing saw to provide individual batteries 10. The batteries 10 failing the test are discarded.

Alternatively, the current collectors 16 and 18 of each battery 10 may be contacted simultaneously before dicing by placing a "bed of nails" consisting of spring-loaded probes fixed into an insulating plate on top of the substrate 102. The pair of wires from each battery may be connected to channels of a battery tester such as a battery tester available from Maccor, Inc. of Tulsa, Okla. under the trade name MACCOR Series 4000 so that all of the batteries on the substrate 102 can be tested at the same time. Examples of suitable probes include probes available from Interconnect Devices, Inc. of Kansas City, Kans. under the catalog number R-100J-DE.

While the foregoing embodiments are applicable to any thin film, rechargeable battery having anodes 24 which expand on charging, the embodiments are particularly applicable to lithium or lithium-ion thin film batteries containing doped solid electrolytes. Particularly preferred doped electrolytes for a lithium or lithium ion battery incorporate a sulfide ion and/or aluminum ion.

A sulfide ion-doped electrolyte is preferably a solid amorphous composition represented by the following formula:

where 2x+3y+2z=5+w, x ranges from about 3.2 to about 3.8, y ranges from about 0.13 to about 0.46, z ranges from greater than zero up to about 0.2, and w ranges from about 2.9 to about 3.3. Compositions of the foregoing formula, preferably contain from about 37.4 to about 39.7 atomic percent lithium ion, from about 11.8 to about 13.1 atomic percent phosphorus ion and from about 41.7 to about 45.4 atomic percent oxygen ion in addition to the sulfide ion and nitrogen ion. Examples of electrolyte compositions having the preferred S/P ratios are given in the following table.

TABLE 2

| Li ion (atomic %) | P ion (atomic %) | Oxygen Ion (atomic %) | Nitrogen ion (atomic %) | Sulfide ion (atomic %) |
|---|---|---|---|---|
| 39.43 | 11.95 | 45.40 | 2.03 | 1.19 |
| 39.66 | 12.02 | 44.47 | 2.64 | 1.20 |
| 37.81 | 13.04 | 43.02 | 4.82 | 1.30 |
| 37.86 | 13.05 | 41.78 | 6.01 | 1.31 |
| 39.36 | 11.93 | 45.33 | 1.59 | 1.79 |
| 37.74 | 13.02 | 42.95 | 4.34 | 1.95 |
| 38.94 | 11.80 | 44.90 | 2.60 | 1.77 |
| 37.40 | 12.89 | 41.84 | 5.93 | 1.93 |

Electrolytes of the foregoing composition may be used in thin-film batteries having oxide-based cathodes, such as $LiCoO_2$ and $LiMn_2O_4$, $LiNiO_2$, and $V_2O_5$ that operate at potentials above 3.8 volts.

The amount of aluminum ion in the electrolyte composition of an aluminum ion-doped electrolyte is expressed in terms of an aluminum ion to phosphorus ion ratio (Al/P). The Al/P ratio may range from greater than zero to about 0.5. Optimum results may be obtained by providing an Al/P ratio ranging from about 0.1 to about 0.3.

As set forth above, the aluminum ion-doped electrolyte film may optionally be doped with a sulfide ion. When present, the amount of sulfide ion in the electrolyte composition is expressed in terms of a sulfide ion to phosphorus ion ratio (S/P). Accordingly, the S/P ratio preferably ranges from greater than zero up to about 0.2, more preferably from about 0.10 to about 0.15, and most preferably about 0.15.

Electrolyte films incorporating an aluminum ion and, optionally, a sulfide ion are preferably solid amorphous compositions represented by the following formula:

$$Li_tP_xAl_yO_uN_vS_w,$$

where $5x+3y=5$, $2u+3v+2w=5+t$, t ranges from about 2.9 to about 3.3, x ranges from about 0.94 to about 0.85, y ranges from about 0.094 to about 0.26, u ranges from about 3.2 to about 3.8, v ranges from about 0.13 to about 0.46, and w ranges from zero to about 0.2. Compositions of the foregoing formula, may contain from about 30 to about 50 atomic percent lithium ion, from about 10 to about 15 atomic percent phosphorus ion, and from about 35 to about 50 atomic percent oxygen ion in addition to the aluminum ion, sulfide ion, and nitrogen ion. Examples of electrolyte film compositions having acceptable Al/P ratios are given in the following table 3.

TABLE 3

| Li ion (atomic %) | P ion (atomic %) | Al Ion (atomic %) | O ion (atomic %) | N ion (atomic %) | S ion (atomic %) |
|---|---|---|---|---|---|
| 32.26 | 10.84 | 3.19 | 42.09 | 5.87 | 0.00 |
| 39.11 | 11.55 | 2.62 | 43.31 | 6.04 | 0.00 |
| 38.95 | 11.90 | 1.96 | 43.14 | 6.01 | 0.00 |
| 38.80 | 12.24 | 1.30 | 42.97 | 5.99 | 0.00 |
| 40.12 | 10.85 | 3.19 | 42.11 | 5.87 | 1.05 |
| 40.03 | 11.16 | 2.54 | 41.86 | 5.83 | 1.12 |
| 39.94 | 11.47 | 1.89 | 41.60 | 5.80 | 1.19 |
| 39.82 | 11.79 | 1.25 | 41.40 | 5.77 | 1.22 |
| 40.93 | 10.52 | 3.09 | 40.83 | 5.69 | 20.3 |
| 40.89 | 10.80 | 2.45 | 40.50 | 5.65 | 2.16 |
| 40.86 | 11.08 | 1.83 | 40.18 | 5.60 | 2.29 |
| 40.76 | 11.38 | 1.21 | 39.94 | 5.57 | 2.35 |

Electrolyte films of the foregoing composition may be used in thin-film batteries having oxide-based cathodes, such as $LiCoO_2$ and $LiMn_2O_4$, that operate at potentials above 3.8 volts.

Having described various aspects, exemplary embodiments, and several advantages thereof, it will be recognized by those of ordinary skills that the disclosed embodiments are susceptible to various modifications, substitutions and revisions within the spirit and scope of the appended claims.

What is claimed is:

1. A method for improving the useful life of a thin film lithium-ion battery containing a solid electrolyte and an anode that expands on charging, comprising providing a hermetic barrier package for the thin film battery that includes an anode expansion absorbing structure, wherein the hermetic barrier package comprises an epoxy adhesive bead surrounding the anode and an oxygen and water vapor resistant cover attached to the adhesive bead providing an anode expansion gap between the cover and the anode.

2. The method of claim 1, wherein the cover is selected from the group consisting of metal, glass, and ceramic.

3. The method of claim 1, wherein the thin film battery comprises a lithium-ion battery containing an anode selected from the group consisting of silicon, tin, and silicon-tin alloys.

4. The method of claim 1, wherein the thin film battery comprises a lithium battery containing a metallic lithium anode.

5. The method of claim 4, wherein the thin film battery comprises a cathode selected from the group consisting of $LiCoO_2$, $LiNiO_2$, $LiMn_2O_4$, and $V_2O_5$.

6. The method of claim 1, wherein the thin film battery comprises a solid lithium phosphorus oxynitride electrolyte containing an aluminum ion dopant and a sulfide ion dopant wherein the atomic ratio of aluminum ion to phosphorus ion ranges from about 0.1 to about 0.3 and the sulfide ion to phosphorus ion (S/P) ratio in the electrolyte ranges from greater than 0 up to about 0.2.

7. The method of claim 6, wherein the solid lithium phosphorus oxynitride electrolyte comprises a composition represented by the formula:

$$Li_tP_xAl_yO_uN_vS_w,$$

wherein $5x+3y=5$ and $2u+3v+2w=5+t$, and wherein for Al/P ratio ranging from about 0.1 to about 0.3, x ranges from about 0.94 to about 0.85, y ranges from about 0.094 to about 0.26, u ranges from about 3.2 to about 3.8, v ranges from about 0.13 to about 0.46, w ranges from greater than zero up to about 0.2, and t ranges from about 2.9 to 3.3.

8. A thin film lithium-ion battery having a solid electrolyte and an anode selected from the group consisting of silicon, tin, and silicon-tin alloys made by the method of claim 1.

9. A semiconductor diagnostic wafer comprising the thin film lithium-ion battery of claim 8.

10. A tire having sidewalls comprising a tire sensor containing the thin film lithium-ion battery of claim 8 laminated in the sidewalls of the tire.

11. A wireless sensor comprising the thin film lithium-ion battery of claim 8.

12. A thin film lithium-ion battery comprising, a cathode, a solid lithium-ion conducting electrolyte, an anode selected from the group consisting of silicon, tin, and silicon-tin alloys, and a hermetic seal for the thin film battery, wherein the hermetic seal comprises an epoxy adhesive bead surrounding the anode and an oxygen and water vapor resistant cover attached to the adhesive bead, and wherein the hermetic seal includes an anode expansion gap between the anode and the cover providing an anode expansion absorbing structure.

13. The thin film battery of claim 12, wherein the cover is selected from the group consisting of metal, glass, and ceramic.

14. The thin film battery of claim 12, wherein the cathode is selected from the group consisting of $LiCoO_2$, $LiNiO_2$, $LiMn_2O_4$, and $V_2O_5$.

15. The thin film battery of claim 12, wherein the electrolyte further comprises an aluminum ion dopant and a sulfide ion dopant wherein the atomic ratio of aluminum ion to phosphorus ion ranges from about 0.1 to about 0.3 and the sulfide ion to phosphorus ion (S/P) ratio in the electrolyte ranges from greater than 0 up to about 0.2.

16. The thin film battery of claim 15, wherein the electrolyte comprises a composition represented by the formula:

$$Li_tP_xAl_yO_uN_vS_w,$$

wherein $5x+3y=5$ and $2u+3v+2w=5+t$, and wherein for Al/P ratio ranging from about 0.1 to about 0.3, x ranges from about 0.94 to about 0.85, y ranges from about 0.094 to about 0.26, u ranges from about 3.2 to about 3.8, v ranges from about 0.13 to about 0.46, w ranges from greater than zero up to about 0.2, and t ranges from about 2.9 to 3.3.

17. A method of making multiple long-life thin film battery cells on a single substrate, comprising the steps of:

depositing battery layers including cathodes, electrolytes, and anodes through appropriate masks onto the substrate;

constructing a hermetic seal for each of the cells, wherein the hermetic seal comprises an anode expansion absorbing structure;

measuring an open circuit voltage and resistance of each of the cells using a wafer prober in conjunction with a programmable electrometer to identify rejected cells;

ink marking the rejected cells; and dicing the substrate to provide a plurality of thin film batteries.

18. The method of claim 17, wherein the step of constructing a hermetic seal for each of the cells comprises:

dispensing epoxy bead lines circumscribing each of the cells;

attaching cover plates to the epoxy bead lines to cover each of the cells and provide an expansion gap between anodes of the cells and the cover plates; and curing the epoxy bead lines by a curing process selected from thermal curing and ultraviolet (UV) light curing.

19. The method of claim 17 wherein the step of constructing a hermetic seal for each of the cells comprises:

vacuum laminating a barrier foil over each of the cells, wherein the barrier foil comprises a compressible polymeric film layer adjacent the anode.

* * * * *